Patented Nov. 3, 1942

2,300,660

UNITED STATES PATENT OFFICE 2,300,660

CARROTING SOLUTION

Constantine F. Fabian, Brookfield, Conn.

No Drawing. Application December 5, 1940,
Serial No. 368,672

3 Claims. (Cl. 8—112)

This invention relates to the art of carroting animal fibers and to a carroting solution for use in carrying out the process. The invention has its greatest field of usefulness in connection with so-called white furs, although it is also useful for gray furs.

The objects of the invention are (1) to impart to the treated fur, principally to white fur, strong and even felting properties without injuring the mechanical strength of the treated fibers, (2) to preserve the weight of the carroted fur in the manufactured hat, (3) to prevent discoloration of the treated white fur, which commonly turns yellow after the carroting treatment, (4) to provide a carroting solution consisting of all volatile ingredients not imparting side reactions, such as chlorination, to the fur, (5) to avoid the use of poisonous mercury salts now commonly employed, (6) to provide a carroting solution free from any other metals, thus avoiding metal poisoning which is injurious to the worker in felt hat manufacture, and (7) to provide an acid carroting solution containing only volatile constituents, excess of which will vaporize during the drying of the treated fur, thus avoiding skin diseases of the worker in hat manufacture.

Other objects and advantages will appear hereinafter during the course of the following description of several examples of the invention.

In recent years much scientific research has been concentrated upon the physical and chemical constitution of animal fibers. This research has revealed not only the properties of the substances which constitute the animal fiber, but also the very substance of the fiber and its internal structure have been investigated. Thus, it has been determined that animal fiber is composed essentially of a complex albuminous body of amphoteric nature, i. e., one possessing acid functions and basic functions at the same time. An exposition of this amphoteric nature is found in my U. S. Letters Patent No. 2,169,997, issued August 22, 1939.

The principal substance of this body is keratin which is the essential element of the greater part of animal fiber. Its composition includes numerous amine acids, the most important being cystine, arginin, and glutamic acid, connected with long polypeptide chains. Cystine is rich in sulphur compound whose properties vary according to the kind of animal, the climate and the nourishment. For example, so-called white rabbit fur, known as white coney, differs greatly from gray rabbit fur, not only in its color but also in its chemical composition and in its action toward acids and oxidizers. Sulphur in white fur is more loosely combined than in gray furs, and the properties of cystine in white furs vary from those of gray fur. Naturally, white furs, differing from gray furs in chemical composition, require a different carroting treatment to impart proper felting properties thereto.

In general, a carroting process comprehends complicated chemical reactions of the carroting reagents on the animal fibers. The action is manifested in four different ways, namely, (1) the absorption of reactives by the fiber, (2) the swelling of the fiber, (3) the hydrolytic destruction of keratin (formation of peptones and amino acids depends upon the taking up of the elements of water by the protein molecule), and (4) the oxidation of intermediate products of hydrolization. These different manifestations vary in depth, in quantity, and in intensity, depending upon the nature of the carroting solution used, upon the nature of the fiber, and upon the temperature of drying, and so on.

Because of its chemical nature, a fur reacts in different ways to different chemical agents with which it comes into contact during the transformation which it undergoes. The fur is also subject to physical factors such as light, irradiation, heat, and microbic actions of decomposition and fermentation.

One of the most important actions on the animal fiber, during the course of the carroting treatment, is that of acids. As a result of the action of different acids on animal fiber, there takes place (in addition to the combination of acids and of basic groups of the keratin molecule) a hydrolytic separation of polypeptide chains with the formation of soluble products of decomposition. This phenomenon results in notable changes in the structure of the fiber, and decrease in its strength. The degree of this decrease of strength depends entirely upon the nature of the acids in the limited ranges of concentrations used in the carroting solution.

The degree of deterioration of animal fiber by different acids can be determined by measuring the decrease of its resistance to breaking. My measurements of the breaking points of different kinds of animal fibers carroted with different strong acids have produced indisputable data in this respect. To begin with, untreated or raw furs, in general, have a higher breaking point than carroted furs. Untreated animal fiber of the gray type is stronger than that of the white type. My measurements indicate that the tensile strength of the uncarroted gray tpes is greater by about 23.6% than that of white types. On the other hand, my measurements show that gray types, after carroting, show a decrease of tensile strength of about 18.3%, whereas white types show a decrease of about 12.7%. It must therefore be recognized that deterioration of animal fiber by acids in carroting solutions is shown by measuring the decrease of resistance to breaking, and that the action of acids is quite different on gray types from what it is on white types.

This loss of strength varies with different kinds of acids. For example, my experiments have shown that sulphuric acid cannot be used successfully on animal fiber in general, and on white fur especially, because sulphuric acid, being non-volatile, is easily diffused into protein because of the great ability of the fiber to absorb sulphuric acid, neutralizes the basic groups of the keratin molecule, and forms soluble products of decomposition, and results in loss of strength and in weight in the making of felt. The action of phosphoric acid in carroting process is quite similar to sulphuric acid, and causes the keratin to pass gradually into solution. Hydrochloric acid also is undesirable in carroting solutions because it greatly decreases the strength of the fiber, probably because of the formation of the chlorhydric group in molecule:

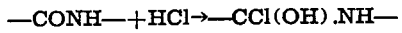
—CONH—+HCl→—CCl(OH).NH—

It has been proposed to use chloric acid in carroting solutions, but its use has been unsuccessful for several reasons. For example, the use of chloric acid is accompanied by chlorination of the animal fiber. This has several disadvantages. Chlorination of the fiber breaks down the keratin substance of the fiber, thereby resulting in loss of weight, and the production of non-felting and non-shrinking properties. Another disadvantage of chloric acid in aqueous solution is the fact that it decomposes readily upon exposure to light, or to warmth, or upon merely standing a considerable time, and this decomposition is accompanied by the liberation of free chlorine in accordance with the following equations:

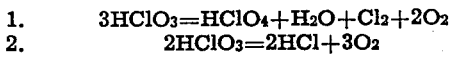
1.     $3HClO_3 = HClO_4 + H_2O + Cl_2 + 2O_2$
2.     $2HClO_3 = 2HCl + 3O_2$ In the second reaction, formation of hydrochloric acid hastens the decomposition of chloric acid in accordance with the equation:

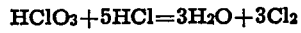
$HClO_3 + 5HCl = 3H_2O + 3Cl_2$

The presence of chlorine on fur used in felt hat manufacture is undesirable for several reasons. One is that free chlorine and chloric acid, being unstable, are a great hazard in the dyeing of felt hats when aniline dyes are used. Another is that fur treated with chloric acid does not withstand storage for any great length of time without deterioration. Still another is that chlorine produces skin diseases on the hands of the felt hat worker.

The action of nitric and nitrous acids in carroting solutions used on animal fiber is more complex. As heretofore used, these acids have produce xanthoproteic reaction (yellow discoloration) on the fiber. My experiments have shown that animal fiber treated with these acids possess less nitrogen content than raw or virgin fiber. However, nitric and nitrous acids have certain important advantages. For example, these acids, when used within the required range of concentration, do not break down the keratin. They can therefore be regarded as excellent acids in all types of acid carroting solutions, provided, however, that yellow discoloration of the fur, as in the case of gray fur, is not too serious an objection, and in such case a fairly high concentration of nitric acid can be used satisfactorily.

However, when it comes to white fur, the situation is different, and nitric acid, as heretofore used in carroting solutions, where it is present in the required high concentrations positively cannot be used. If, however, the concentration is low, nitric acid can be used with success in carroting solutions on white fur because, in low concentrations, nitric acid does not produce xanthoproteic reaction and does not impart yellow discoloration to the fur. Thus, I have found, for example, that a concentration of nitric acid of not more than 3% of technical nitric acid (40% Bé.) in combination with other carroting agents, can successfully be employed in treating white type furs.

I have found that perchloric acid, in aqueous solution, causes remarkable reactions on animal fiber. For example, raw fur, after treatment with perchloric acid retains practically the same tensile strength. In this connection, my measurements have shown that white fur, after treatment with perchloric acid, shows a loss in tensile strength of only about 2% to 4%, whereas mercury treated fur shows a loss of not less than 12% in tensile strength. Another advantage of perchloric acid is that the treated fur, when placed in boiling water, keeps its weight.

I attribute this phenomenon to the fact that perchloric acid in aqueous solution being the most stable of the oxy-acids of chlorine, produces a strong hydrolysis of the principal peptic chains. As a result, the free amino groups fix themselves on the chain of arginin and cystine of the keratin molecule in such a manner that they cease to be accessible to reaction. As a result of the transformation of these amino groups to OH groups, and also because of the viscosity of the films formed on the surface of the fiber by the adsorbed perchloric acid, diffusion of the dissolved protein becomes practically impossible. Consequently, the fiber is protected against a new attack of the acid, because of the protection afforded by the film caused by products of reaction formed at the beginning of the treatment.

Another advantage of perchloric acid is that it does not produce side reactions, such as chlorination, on the fiber, because perchloric acid in aqueous solution remains stable, and, in this respect, differs from chloric acid which produces two side reactions, namely, chlorination and oxidation. It follows that perchloric acid is an ideal acid in carroting solutions.

I have found that perchloric acid, in combination with nitric acid and hydrogen peroxide, in proper concentrations and proportions to each other, and without other undesirable ingredients such as mercury and other metals, and non-volatile substances, provides a satisfactory and workable carroting solution for general use on white types of fur. I have also established that the presence of a low concentration of nitric acid in such a carroting solution is absolutely essential, because nitric acid, even in very small quantity, stabilizes the perchloric acid in its contact with organic matter. Furthermore, my experiments have shown that perchloric acid, in aqueous solution, when in the presence of nitric acid, can be handled and applied safely, and can remain indefinitely on the animal fiber without dangerous effect.

In accordance with the present invention, perchloric acid can be used in a rather wide range of concentration. The concentration of perchloric acid depends principally upon two factors, namely, the method of application and the condition of the skins. If the skins are to be brushed lightly, then the concentration of perchloric acid should be relatively great. The same is true if the skins are moist, or greasy, or bloody. I have found that with white type skins a satisfactory range of concentration of the perchloric acid in the carroting solution is from 5% to 8.5% by weight of technical 68% to 70%, though this range may be increased slightly with gray furs, as will presently appear.

When white type fur is to be carroted, I admix with the perchloric acid a low concentration of nitric acid for the sole purpose of stabilizing the perchloric acid and preventing deterioration of the fur on drying and in storage. I have found that a concentration of not more than 3% by weight of nitric acid (tech. 40% Bé.) is suitable in a carroting solution to be employed for white type furs, though, as will presently appear, the concentration may be increased for gray type fur.

While I employ the nitric acid for the purpose of stabilizing the perchloric acid, it is probable that nitric acid tends to increase the viscosity of the film formed on the surface of the fiber due to hydrolizing action of the perchloric acid. In this case, nitric acid possibly functions as an inhibitor in protecting the fiber against excessive hydrolitic action of the perchloric acid. The concentration of the nitric acid in the carroting solution can be increased above 3% if one is willing to sacrifice the color of white type fur, and, as already indicated, if gray type fur is to be carroted.

The desired oxidizer can be selected from a group of peroxides and peracids, as for example, persulphates and perborates. However, I prefer to employ hydrogen peroxide as an oxidizer. The concentration of hydrogen peroxide can be varied in quite a wide range. However, I have found that a satisfactory range which I prefer is from 14% to 20% by weight of 100 volume technical hydrogen peroxide. 100 volume hydrogen peroxide has approximately 30% by weight of actual hydrogen peroxide.

I prefer to employ hydrogen peroxide as the oxidizer because it is volatile, and I consider that a volatile oxidizer is important because if a non-volatile oxidizer were employed, any oxidizer remaining on the fur after carroting would inflict dangerous irritation on the skin of the worker in hat manufacturing operations. Furthermore, any non-volatile ingredients such as non-volatile peroxides and non-volatile acids used in carroting solutions are also objectionable because they remain on the fur and continue to chemically attack the fiber.

For these reasons, I employ in my carroting solution only volatile ingredients, namely perchloric acid (which can be regarded as volatile in low concentration), nitric acid, hydrogen peroxide, and water. Furthermore, these ingredients do not produce so-called side reactions, such as chlorination. Metallic salts are absent from the carroting solution, and for this reason metallic poisoning of the worker is avoided, catalytic reaction on the fiber is eliminated, and excessive decomposition of the hydrogen peroxide is prevented. Thus the solution may be characterized as a four-component, non-side reactive, non-metallic carroting solution.

The invention will best be understood from the following illustrative examples:

*Example 1 (for white or gray fur)*

| | Per cent by weight |
|---|---|
| Perchloric acid (tech. 68–70%) | 5 |
| Nitric acid (tech. 40° Bé.) | 2 |
| Hydrogen peroxide (tech. 100 V.) | 14 |
| Water | 79 |

*Example 2 (for white or gray fur)*

| | Per cent by weight |
|---|---|
| Perchloric acid (tech. 68–70%) | 8.5 |
| Nitric acid (tech. 40° Bé.) | 3 |
| Hydrogen peroxide (tech. 100 V.) | 20 |
| Water | 68.5 |

*Example 3 (for gray fur only)*

| | Per cent by weight |
|---|---|
| Perchloric acid (tech 68–70%) | 4–9 |
| Nitric acid (tech. 40° Bé.) | 1.5–3 |
| Hydrogen peroxide (tech. 100 V.) | 14–20 |
| Water to make up the balance | |

Having thus described the invention, what I claim is:

1. An aqueous solution for carroting fur and the like comprising perchloric acid (tech. 68–70%) 5% by weight, nitric acid (tech. 40° Bé.) 2% by weight, hydrogen peroxide (tech. 100 V.) 14% by weight, and water 79% by weight.

2. An aqueous solution for carroting fur and the like comprising perchloric acid (tech. 68–70%) 8.5% by weight, nitric acid (tech. 40° Bé.) 3% by weight, hydrogen peroxide (tech. 100 V.) 20% by weight, and water 68.5% by weight.

3. An aqueous solution for carroting fur and the like comprising perchloric acid (tech. 68–70%) 4–9% by weight, nitric acid (tech. 40 Bé.) 1.5–3% by weight, hydrogen peroxide (tech. 100 V.) 14–20% by weight, and water to make up the balance.

CONSTANTINE F. FABIAN.